Patented Sept. 24, 1929

UNITED STATES PATENT OFFICE

OSWALD MEYER, OF OFFENBACH-ON-THE-MAIN, GERMANY, ASSIGNOR TO GENERAL ANILINE WORKS, INC., OF NEW YORK, N. Y., A CORPORATION OF DELAWARE

NEW SALTLIKE COMPOUND DERIVED FROM DYESTUFF BASES OF THE TRIARYL-METHANE SERIES AND PROCESS OF MAKING SAME

No Drawing. Application filed June 30, 1927, Serial No. 202,749, and in Germany July 5, 1926.

My invention relates to valuable new salt like compounds corresponding probably to the general formula:

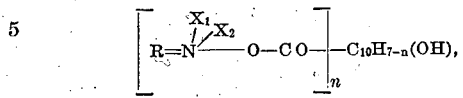

in which formula R means the residue of a dyestuff of the triarylmethane series, $X_1$ and $X_2$ hydrogen or an alkylgroup, $n$ the number 1 or 2, which compounds may be obtained by a double decomposition of a basic dyestuff body of the triarylmethane series with a hydroxynaphthoic acid compound not containing a sulfonic group. By the expression "sulfonic group" I wish to be understood "the sulfonic acid group as well as the salts thereof". In order to carry out the process practically dyestuff salts of the triarylmethane series may be decomposed by means of alkali metal salts of hydroxynaphthoic acids, advantageously by using aqueous solutions of both components, whereby the new compounds separate as insoluble precipitates. One may also cause a carbinol base of the triarylmethane series to react with a hydroxynaphthoic acid, advantageously in an alcoholic solution.

The new salt like compounds thus obtained are when dry colored powders of a metalic lustre, almost insoluble in water, easily soluble in spirit. They may be used instead of the dyestuffs soluble in spirit, which are known hitherto, their insolubility in water being of an especial advantage. They are therefore particularly suitable for the production of such printing colors soluble in spirit, which are insoluble in water after printing.

Compounds obtainable by reacting with a 2.3-hydroxynaphthoic acid compound on dyestuff bodies of the triarylmethane series, especially of the para-rosaniline type, are of a particular value.

The following examples will further illustrate my invention, the parts being by weight and all temperatures in centigrade degrees, the formulæ being given according to the present idea of the chemical constitution of the dyestuffs in question; it is understood, that my invention is not limited to the particular proportions, reacting conditions or materials listed therein.

Example 1

282 parts of 2.3-hydroxynaphthoic acid are dissolved in 60 parts of caustic soda and 9000 parts of water and at 50–60° while stirring well the solution is added to a solution of 308 parts of fuchsine chlorhydrate in 20000 parts of water, this latter solution having a temperature of 50°. After cooling down the precipitate is filtered, if necesary, digested once more with cold water for removing unchanged fuchsine if present in the precipitate and dried. It corresponds probably to the formula:

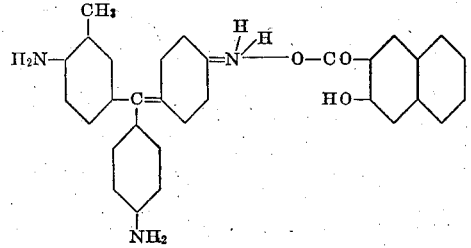

Example 2

282 parts of 2.3-hydroxynaphthoic acid are dissolved in 60 parts of caustic soda and 9000 parts of water and at 50–60° while stirring a warm solution of 236 parts of methylviolet in form of its chlorhydrate in 12000 parts of water is added. The precipitate thus obtained is then treated as described in Example 1. It corresponds probably to the formula:

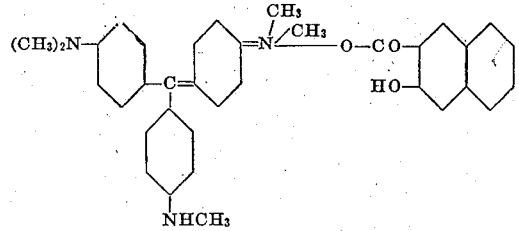

Example 3

376 parts of 2.6-naphthol carboxylic acid are dissolved in 80 parts of caustic soda and in 12000 parts of water and at 50–60° while well stirring a warm solution of 463 parts of benzal green in form of its oxalate in 20000 parts of water is added. The precipitate thus formed corresponds probably to the formula:

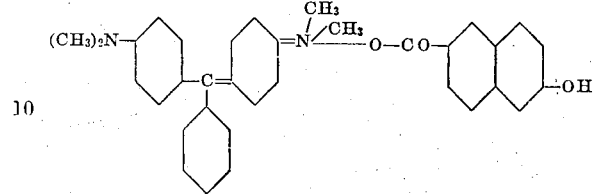

Example 4

232 parts of 2.3.6-naphtholdicarboxylic acid are dissolved in 80 parts of caustic soda and 10000 parts of water and at 50–60° while stirring a warm solution of 410 parts of fuchsine chlorhydrate in 25000 parts of water is added. The precipitate thus formed is treated as described in Example 1. It corresponds probably to the formula:

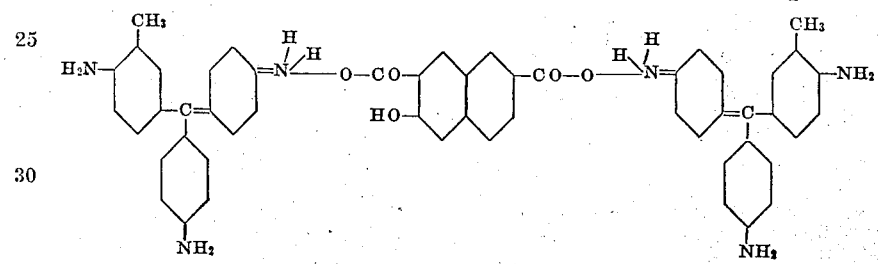

In the appended claims by the expression "basic dyestuff body of the triarylmethane series" I mean to include carbinol bases of the triarylmethane series and salts thereof.

I claim:

1. As new products salt like compounds corresponding probably to the general formula:

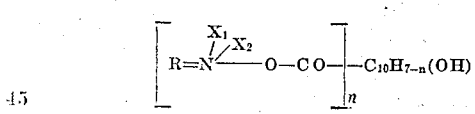

in which formula R means the residue of a dyestuff of the triarylmethane series, $X_1$ and $X_2$ hydrogen or an alkylgroup, $n$ the number 1 or 2, which compounds are when dry colored powders of a metallic lustre, almost insoluble in water, easily soluble in spirit, which compounds are substantially identical with the products obtainable by double decomposition of a basic dyestuff body of the triarylmethane series with a hydroxynaphthoic compound not containing a sulfonic group.

2. A process for producing new salt like compounds which process comprises decomposing a basic dyestuff body of the triarylmethane series by means of a hydroxynaphthoic compound not containing a sulfonic group.

3. A process for producing new salt like compounds which process comprises decomposing at moderately elevated temperatures a basic dyestuff body of the triarylmethane series by means of a hydroxynaphthoic compound not containing a sulfonic group.

4. A process for producing new salt like compounds which process comprises decomposing at temperatures from about 50–60° a basic dyestuff body of the triarylmethane series by means of a hydroxynaphthoic compound not containing a sulfonic group.

5. A process for producing new salt like compounds which process comprises decomposing a salt of a basic dyestuff of the triarylmethane series by means of an alkali metal salt of a hydroxynaphthoic acid.

6. A process for producing new salt like compounds which process comprises decomposing an aqueous solution of a salt of a basic dyestuff of the triarylmethane series by means of an aqueous solution of an alkali metal salt of a hydroxynaphthoic acid.

7. As new products salt like compounds corresponding probably to the general formula:

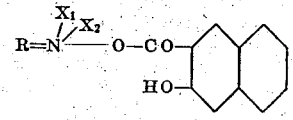

in which formula R means the residue of a dyestuff of the triarylmethane series, $X_1$ and $X_2$ hydrogen or an alkylgroup, which compounds are when dry colored powders of a metallic lustre, almost insoluble in water, easily soluble in spirit, which compounds are substantially identical with the products obtainable by double decomposition of a basic dyestuff body of the triarylmethane series with a 2.3-hydroxynaphthoic compound not containing a sulfonic group.

8. A process for producing new salt like compounds which process comprises decomposing a basic dyestuff body of the triarylmethane series by means of a 2.3-hydroxynaphthoic compound not containing a sulfonic group.

9. As new products salt like compounds corresponding probably to the general formula:

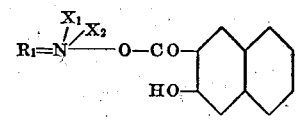

in which formula $R_1$ means the residue of a dyestuff of the para-rosaniline type, $X_1$ and $X_2$ hydrogen or an alkylgroup, which compounds are when dry colored powders of a metallic lustre, almost insoluble in water, easily soluble in spirit, which compounds are substantially identical with the products obtainable by double decomposition of a dyestuff body of the para-rosaniline type with a 2.3-hydroxynaphthoic compound not containing a sulfonic group.

10. A process for producing new salt like compounds which process comprises decomposing a dyestuff body of the para-rosaniline type by means of a 2.3-hydroxynaphthoic compound not containing a sulfonic group.

11. A process for producing new salt like compounds which process comprises decomposing a basic dyestuff body of the triarylmethane series by means of a hydroxynaphthoic compound not containing a sulfonic group, in the presence of a solvent for the said basic dyestuff body.

12. A process for producing new salt like compounds which process comprises decomposing at moderately elevated temperatures a basic dyestuff body of the triarylmethane series by means of a hydroxynaphthoic compound not containing a sulfonic group, in the presence of a solvent for the said basic dyestuff body.

13. A process for producing new salt like compounds which process comprises decomposing at temperatures from about 50-60° a basic dyestuff body of the triarylmethane series by means of a hydroxynaphthoic compound not containing a sulfonic group, in the presence of a solvent for the said dyestuff salt.

14. A process for producing new salt like compounds which process comprises decomposing a salt of a basic dyestuff of the triarylmethane series by means of an alkali metal salt of a hydroxynaphthoic acid, in the presence of a mutual solvent.

15. A process for producing new salt like compounds which process comprises decomposing a basic dyestuff body of the triarylmethane series by means of a 2.3-hydroxynaphthoic compound not containing a sulfonic group, in the presence of a solvent for the said basic dyestuff body.

16. A process for producing new salt like compounds which process comprises decomposing a dyestuff body of the para-rosaniline type by means of a 2.3-hydroxynaphthoic compound not containing a sulfonic group, in the presence of a solvent for the said dyestuff body.

In testimony whereof, I affix my signature.

OSWALD MEYER.